(12) United States Patent
Polackal et al.

(10) Patent No.: US 12,073,248 B2
(45) Date of Patent: Aug. 27, 2024

(54) SERVER GROUPINGS BASED ON ACTION CONTEXTS

(71) Applicant: Hewlett Packard Enterprise Development LP, Houston, TX (US)

(72) Inventors: Bino Joseph Polackal, Karnataka (IN); Sandeep Bangalore Harshavardhana, Karnataka (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 574 days.

(21) Appl. No.: 17/227,647

(22) Filed: Apr. 12, 2021

(65) Prior Publication Data

US 2021/0373953 A1  Dec. 2, 2021

(51) Int. Cl.
*G06F 9/50* (2006.01)
*H04L 67/50* (2022.01)

(52) U.S. Cl.
CPC .......... *G06F 9/5011* (2013.01); *H04L 67/535* (2022.05)

(58) Field of Classification Search
CPC ............. G06F 9/5011; G06F 16/24578; G06F 16/285; H04L 67/288; H04L 67/535
See application file for complete search history.

(56) References Cited

U.S. PATENT DOCUMENTS

| | | | |
|---|---|---|---|
| 7,020,706 B2 | 3/2006 | Cates et al. | |
| 8,065,397 B2 | 11/2011 | Taylor et al. | |
| 8,572,679 B1 | 10/2013 | Wang et al. | |
| 9,280,661 B2 | 3/2016 | Adjaoute | |
| 10,218,779 B1* | 2/2019 | Cheng | H04L 67/1008 |
| 2006/0107265 A1* | 5/2006 | Schulz | G06Q 10/06 718/100 |
| 2013/0054788 A1* | 2/2013 | Corddry | H04L 41/0893 709/224 |
| 2014/0006597 A1 | 1/2014 | Ganguli et al. | |
| 2015/0277892 A1 | 10/2015 | Zeng | |
| 2016/0103705 A1* | 4/2016 | Wang | G06F 9/5061 718/104 |
| 2017/0075622 A1* | 3/2017 | Kwon | G06F 3/0613 |
| 2018/0196697 A1* | 7/2018 | Standefer | G06Q 10/103 |
| 2019/0235851 A1 | 8/2019 | Vergara | |
| 2021/0271540 A1* | 9/2021 | Sinnan Muthusamy | G06F 11/079 |
| 2022/0091899 A1* | 3/2022 | Biernat | G06F 9/45558 |
| 2022/0398128 A1* | 12/2022 | Jose, Jr. | G06F 9/4881 |

* cited by examiner

*Primary Examiner* — Benjamin C Wu
(74) *Attorney, Agent, or Firm* — Trop, Pruner & Hu, P.C.

(57) ABSTRACT

Example implementations relate to method and system for an action contextual grouping of servers for applying one or more actions to each group. The method includes analyzing data corresponding to a plurality of servers and a management system to generate a dataset including contextual data and server features. The method further includes obtaining a plurality of actions from the management system, and mapping each action to a plurality of criteria to generate an action criteria table. The plurality of criteria includes dynamic contextual criteria derived by the management system based on at least some of contextual data. The method further includes comparing the plurality of criteria for each action in the action criteria table to the contextual data and/or the server features for each server to tag a corresponding server to the action, and grouping the plurality of servers into a plurality of action contextual groups based on the tag.

19 Claims, 4 Drawing Sheets

SERVER GROUPINGS BASED ON ACTION CONTEXTS

BACKGROUND

Large scale computing environments, e.g., such as those providing cloud services may include thousands of diverse computing nodes, for example, servers arranged in one or more data centers. Data center may operate with different variants of servers and operating systems, with diverse firmware and various applications. In general, a highly efficient and strategic autonomous data center management is a key requirement for customer satisfaction. Therefore, a management system used to manage the data center may apply various server actions on diverse servers to keep them updated for performing intended functions without downtime, thereby achieving the customer satisfaction. However, performing server actions, such as firmware updates, software updates, security patches updates, configuration actions, and the like on thousands of diverse servers is a huge challenge and may create network bottleneck.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
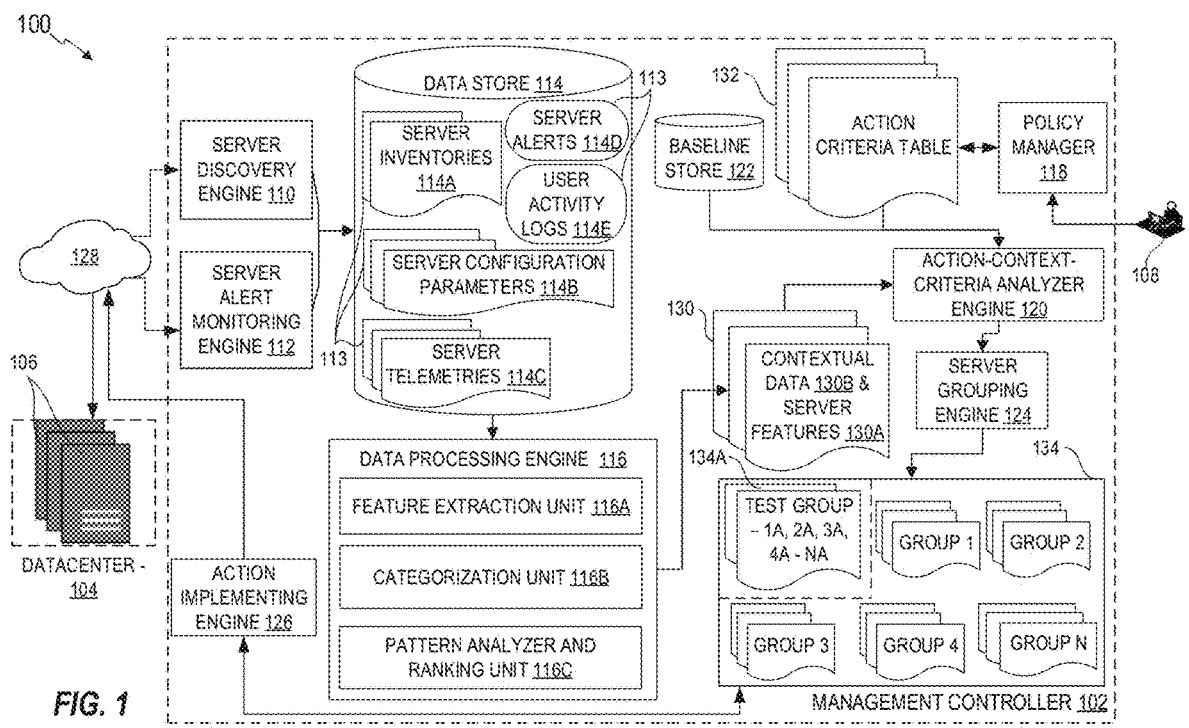
FIG. 1 is an example computing system, for example, a management system coupled to a plurality of servers of a data center, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

It emphasized herein that, in the drawings, various features are not drawn to scale. In fact, in the drawings, the dimensions of the various features have been arbitrarily increased or reduced for clarity of discussion. In other words, the figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The term "contextual data" refers to data that provides context/characteristic information between a server alert and a user activity log. Similarly, the term "server feature" refers to data that provides information related to inventory, configuration, and telemetry of the server hosted in a data center landscape. The term "criteria" refer to a distinctive condition to trigger a server action for the management of servers hosted in the data center landscape. The term "action" or "server action" refers to one or more server operations/activities, such as patch update, configuration update, user profile update, and the like, that a management system applies as part of the management of the servers. The term "action context group" refers to a unique cluster of the plurality of servers having a similar tag. The term "tag" refers to label attached to the plurality of servers hosted in the data center for identification purpose to apply the server action.

The present disclosure describes example implementations of a system and method for providing an "action context" aware dynamic grouping of servers. In some examples, a system, for example, a management system may automatically understand data center landscape by collecting sufficient data, such as server configuration parameters, server inventories, server telemetries, and context data, which includes the server alerts and user activity logs, and intelligently create dynamic server groups for performing specific server actions. In one or more examples, the management system may first generate a data set including a plurality of contextual data and a plurality of server features based on analysis of the collected data. In such examples, one or more of the plurality of contextual data or the server features are used as a plurality of criteria that may trigger specific server actions. The management system may later compare the plurality of criteria corresponding to each action with the plurality of contextual data and/or the plurality of server features for each server, to tag a corresponding server to the action contextual group. Accordingly, the management system may trigger a specific server action, for example, a firmware update action only to a corresponding action contextual group as part of management of the data center.

For purposes of explanation, certain examples are described with reference to the components illustrated in FIGS. 1-4. The functionality of the illustrated components may overlap, however, and may be present in a fewer or greater number of elements and components. Further, all or part of the functionalities of illustrated elements may co-exist or distributed among several geographically dispersed locations. Moreover, the disclosed examples may be implemented in various environments and are not limited to the illustrated examples. Further, the sequence of operations described in connection with FIG. 4 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

Data center may host tens of thousands of server variants spread over generations, for providing intended services to one or more customers. Further, those tens of thousands of server variants may have diverse operating systems, firmware versions, software versions, hardware components, etc. Therefore, a highly efficient and strategic autonomous data center management is key to maintain such diverse server variants up to date for providing the intended services without downtime of the customer workload and keeping the customer environment secure.

A management system, which is commutatively coupled to the data center may monitor diverse servers, receive alerts/notifications generated from such diverse servers, and triggers server actions based on one or more instructions from a data center administrator(s). For example, the administrator may identify a group of diverse servers for server updates, such as firmware updates, and apply the server actions to periodically update the firmware on the group of diverse servers over a period of several months. However, performing the server actions, such as the firmware updates, software updates, security patch updates, configuration actions, and the like on the tens of thousands of diverse servers is a huge challenge. In other words, performing the server actions or operations or activities on those diverse servers by manually selecting the diverse servers and creating static groups of diverse servers is an enormous, an inefficient, and a sluggish process to meet the customer requirements.

Usually, the administrator groups the diverse servers as per the business needs of the customer. For example, the administrator may save the groups before performing updates, modify the groups, then perform the server action and restore the previous groups that are optimal for business needs. Thus, it may be cumbersome for the administrator to group the tens of thousands of diverse servers in a manner that is beneficial for performing server actions irrespective of the business needs. The administrator may also find it extremely challenging to find a right mix of test servers for assessing the impact of the server action, for example, firmware update action before rolling it over the production servers running the production application.

A technical solution to the aforementioned problems includes providing "action context" aware dynamic grouping of servers by automatically understanding the data center landscape by collecting sufficient server data, such as parameters, inventories, telemetries, and context data, such as server alerts and user activity logs, and intelligently creating dynamic server groups based on the analyzed data for performing specific server actions. The system may continuously learn and extract the context from the collected server data, and automatically identify patterns based on current and past server actions, and generate server features and future contextual data for triggering the server actions. Based on the server features and future contextual data, the system may dynamically categorize the servers into different groups with different depths and hierarchy. For each context wherever applicable, the system may also create an optimal minimal subset group for performing tests to detect early errors, which may otherwise result in workload downtime. Thus, in accordance to some examples of the present disclosure, automatically detecting the data center landscape having diverse servers and identifying the "action context" offers providing intelligent guidance to categorize the diverse servers into the plurality of action context groups for performing the specific server actions, like upgrades, security patch updates, and various other server management operations.

Accordingly, the system and method of the present invention is includes the step of analyzing data corresponding to a plurality of servers hosted in a data center and a management system to generate a dataset including a plurality of contextual data and a plurality of server features for each server of the plurality of servers. Further, the method includes the steps of obtaining a plurality of actions that the management system supports for the management of the plurality of servers, and mapping each of the plurality of actions to a plurality of criteria to generate an action criteria table. In such examples, the plurality of criteria may include a dynamic contextual criteria derived by the management system based on at least some of the plurality of contextual data. The method further includes the step of comparing the plurality of criteria corresponding to each action in the action criteria table to one or more of the plurality of contextual data or the plurality of server features for each server to tag a corresponding server to the action. Finally, the method includes the step of grouping the plurality of servers into a plurality of action contextual groups based on the tag of the corresponding server to the action.

In some examples, the management system may generate the plurality of contextual data by analyzing the data including server alerts and user activity logs. In particular, the management system may cluster the server alerts based on a plurality of parameters to generate a plurality of clustered data, and later analyze the user activity logs corresponding to each of the plurality of clustered data to identify a plurality of patterns. Further, the management system may rank the plurality of patterns for each cluster to generate the plurality of contextual data. In some examples, the management system may generate the data set including the server parameters by analyzing the data including the server inventories, the server telemetries, and the server configuration parameters. In particular, the management system may normalize the server inventories, the server telemetries, the server configuration parameters to generate the server features.

In some examples, the management system may cluster one or more servers in each action contextual group into an action contextual sub-group. The management system may later evaluate each of the plurality of actions in the action criteria table, on the one or more servers of the action contextual sub-group. The management system may then apply the evaluated action on the plurality of servers corresponding to the action contextual group based on the evaluation result of the action on the one or more servers of the action contextual sub-group.

FIG. 1 illustrates an example environment 100 in which a computing system, such as a management system 102 is operably coupled to a data center 104 for management of a plurality of compute nodes, such as a plurality of servers 106 hosted in the data center 104. The example environment 100 may be implemented as an enterprise system or a consumer system, or an industrial system that facilitates to execute a workload on one or more of the plurality of servers 106 for delivering intended service to a customer, and secure the workload running on the one or more of the plurality of servers 106 in parallel. In some examples, a customer or an external customer, or combinations thereof, may own the data center 104 and offer a cloud service to execute the workload of the customers using the data center 104.

In some examples, an administrator 108 may manage the management system 102 and the data center 104. It may be noted that the administrator 108 may a representative of the data center 104 accessing the plurality of servers 106 through the management system 102 or the representative of some of the individual server of the plurality of servers 106. In some examples, the management system 102 may provide a graphical user interface (GUI) for the administrator 108 to interact and manage the example environment 100. In some other examples, the management system 102 may provide a command-line interface for the administrator 108 to interact and manage the example environment 100.

In some examples, the management system 102 may be a server deployed outside the data center 104. However, in some other examples, the management system 102 may be part of the plurality of servers 106 of the data center 104. In one or more examples, the management system 102 may be an appliance deployed in the data center 104 for performing certain functionalities, such as discovering the plurality of servers 106, managing inventory in the data center 104, monitoring the plurality of servers 106, implementing server actions on the plurality of servers 106, and the like. In one or more examples, the example management system 102 includes a server discovery engine 110, a server alert monitoring engine 112, a data store 114, a data processing engine 116, a policy manager 118, an action-context-criteria analyzer engine 120, a server grouping engine 124, and an action implementing engine 126. The data processing engine 116 includes a feature extraction unit 116A, a categorization unit 116B, and a pattern analyzer and ranking unit 116C. In one or more examples, the server discovery engine 110, the server alert monitoring engine 112, the data processing engine 116, the policy manager 118, the action-context-criteria analyzer engine 120, the server grouping engine 124, and the action implementing engine 126 may be implemented using a processing resource (not shown) of the management system 102. The processing resource may implement functionalities of the server discovery engine 110, the server alert monitoring engine 112, the data processing engine 116, the policy manager 118, the action-context-criteria analyzer engine 120, the server grouping engine 124, and the action implementing engine 126 by executing program instructions stored in a machine readable medium (not shown) of the management system 102. The functionalities of the server discovery engine 110, the server alert monitoring engine 112, the data processing engine 116, the policy manager 118, the action-context-criteria analyzer engine 120, the server grouping engine 124, and the action implementing engine 126 are described in greater details below. It may be noted herein that the term "action" and "server action" may be used interchangeably. Similarly, the term "user" and "administrator" may be used interchangeably.

In the illustrated example, the management system 102 is operably connected to the data center 104 over a network 128. In such examples, the network 128 may be a TCP/IP (Transmission Control Protocol/Internet Protocol) network, which is a suite of communication protocols used to interconnect network devices on internet. In other examples, the management system 102 may be directly coupled to the data center 104 using physical network cables. In one or more examples, the management system 102 may interact with the plurality of servers 106 using a controller (not shown), such as a management controller deployed in each of the plurality of servers 106. In some examples, the management controller may be a baseboard management controller (BMC).

The data center 104 may include a lot of infrastructure resources, such as the plurality of servers 106, cooling devices, power supply and management devices, storage area networks (SANs), networking interconnects, (not shown) and the like. The data center 104 having the plurality of servers 106 is used for describing principles of the present disclosure, and such a disclosure should not be construed as limitation of the present invention.

In some examples, the data center 104 may have different variants of the plurality of servers 106, where each variant of the plurality of servers 106 may have diverse operation systems, operating system versions, firmware versions, software applications and versions, configuration files, workloads, and the like. It may be noted herein that every physical server 106 may have manufacturer name and model number, physical attributes (memory, CPU, storage, network adapter, host bus adapter), firmware, location, media access control addresses, internet protocol addresses and virtual local-area network, configuration settings, operating systems or hypervisors. Further, the data center 104 may also include a plurality of virtual servers (not shown) running on each physical server 106, applications or services running on each physical server 106 and/or virtual server, and known interrelationships between the servers 106. It may be noted herein that the term "server" and "physical server" may be used interchangeably.

In such example, the server discovery engine 110 may perform the server discovery operation on the data center 104, and thereby determine server data 113, such as server inventories 114A, which includes, for example, hardware inventory, firmware inventory, and software inventory. Further, the server discovery engine 110 may discover server configuration parameters 114B, which includes, for example, a basic input/output system (BIOS) configuration parameter and smart storage configuration parameters, and the like. The server discovery engine 110 may further gather server telemetries 114C, for example, central processing unit (CPU), memory, and input/output (IO) utilization for each variant of the plurality of servers 106. In some examples, the server discovery engine 110 may execute one or more commands to perform the server discovery operation. For example, the server discovery operation may scan the data center 104 landscape to extract the server data 113 including the server inventories 114A, the server configuration files/parameters 114B, and the server telemetries 114C for each server of the plurality of servers 106. Thus, the server discovery engine 110 may extract the server data 113 from every physical server 106 and store the extracted server data 113 in the data store 114. It may be noted herein that the term "data" and "server data" may be used interchangeably.

During operation of the data center 104, the plurality of servers 106 may generate the server data 113, such as server alerts 114D when it encounters fault events, issues, or during maintenance of the plurality of servers 106. In one or more examples, the server alerts 114D may be events, issues, or parameters corresponding to the fault event. In non-limiting examples, the events may be event logs (IEL), redfish events, and the like. Similarly, the parameters may be system management BIOS records, machine checks (MCA) banks, sensors data, and the like. In such situations, each of the plurality of servers 106 may simultaneously record the fault event in a corresponding log file of a plurality of log files.

The server alert monitoring engine 112 may subscribe to the data center 104 for receiving the data 113, such as the server alerts 114D from the plurality of servers 106. In such examples, when the server alerts 114D are generated by the plurality of servers 106, the server alert monitoring engine 112 may receive the server alerts 114D from the management controller of the plurality of servers 106, over the network 128, for example, a management network, production network, or both (not shown in FIG. 1). In other words, the server alert monitoring engine 112 may subscribe for management controller events/alerts from each of the plurality of servers 106, which includes the hardware error events and the configuration changes events, and listens to all these server alerts 114D from the plurality of servers 106. The alert monitoring engine 112 may subsequently store the received server alerts 114D in the data store 114.

In some examples, the management system 102 may create a support case related to the server alert 114D, attach the one or more log files related to the support case, and provide the one or more log files to the administrator 108 (backend support team or support engineer) for investigating and root causing the issue for the support case. Subsequent to the root causing the issue, the management system 102 may store the support case related to the server alert 114D, the one or more log files related to the support case, and resolutions for the issue belonging to the support case as the server data 113, for example, a user activity log 114E in the data store 114. It may be noted herein that the data store 114 may additionally include historical support cases (i.e., plurality of support cases) related to historical server alerts 114D, the log files related to each support case, and resolutions for each support case as the user activity logs 114E. Those historical support cases related to the server alerts 114D and the user activity logs 114E are collected/created in the past during various customer case creation process. In some examples, the user activity logs 114E also includes an action/activity the user performs based on the server alerts 114D, for example, the server alert based on a server firmware version. In other words, the management system 102 logs into the data store 114 all the server actions/activities performed by the user/administrator to keep track of the historical activities performed by the user to identify user patterns.

In some other examples, the management system 102 may provide the server alerts 114D to the administrator 108 for applying appropriate server actions. For example, when the server alerts 114D corresponds to outdated firmware version, the administrator 108 may apply the updated firmware version to the plurality of servers 106. In some examples, the management system 102 may subsequently record such user activity log 114E in the data store 114. In one or more examples, the management system 102 may store all such historical server alerts 114D and the corresponding user activity logs 114E in the data store 114.

In non-limiting examples, the data store 114 may include the unrefined server data 113, such as the server inventories 114A, the server configuration parameters 114B, the server telemetries 114C, the server alerts 114D, and the user activity logs 114E. In some examples, the server inventories 114A may include hardware, firmware, and software inventories of the plurality of servers 106. The server configuration parameters 114B may include BIOS configurations, storage configurations, and user configurations, such as user data, settings, policies, and the like related to the management system 102. The server telemetries 114C may include CPU, memory, IO, thermal, performance utilization data. The server alerts 114D may include server events, alerts, and notifications received from the plurality of servers 106. In some examples, the user activity logs 114E may include the resolutions that the support team has taken to resolve the issues. In some other examples, the user activity logs 114E may include periodic actions/activities, which are based on the user or administrator interaction with the plurality of servers 106 and the reactions from the plurality of servers 106. Further, the user activity logs 114E may also include data, such as number of times various server actions that were performed on each of the plurality of servers 106 and the time/schedule at which such server actions were performed on each of the plurality of servers 106.

In one or more examples, the data processing engine 116 may access the data store 114 to obtain the unprocessed server data 113 including the server inventories 114A, the server configuration parameters 114B, and the server telemetries 114C for each of the plurality of servers 106. Further, the data processing engine 116 may scan and analyze the server data 113 for each of the plurality of servers 106 to generate a data set 130 including a plurality of server features 130A.

In one or more examples, the feature extraction unit 116A may be used for analyzing the server inventories 114A, the server configuration parameters 114B, and the server telemetries 114C to generate the plurality of server features 130A. In such examples, the feature extraction unit 116A may normalize the server data 113 for each server to generate a data set 130 including a plurality of server features 130A. It may be noted herein that normalizing the server data 113 may include the steps of removing data redundancy (repetition) and undesirable characteristics, such as anomalies and the like from the server data 113.

In some examples, the plurality of server features 130A includes server static features, servers dynamic features, server configuration features, server workload patterns, server firmware versions, operating system versions, ports values, and server's CPU, memory, thermal, IO utilization features, or percentage of memory and CPU usage by the servers, and the like. In some examples, the server static features includes server manufacturer name and model numbers, a physical attributes, and the like. The server dynamic features includes thermal sensor values, register values, and the like.

In one or more examples, the data processing engine 116 may further access the data store 114 to obtain the unprocessed server data 113 including the server alerts 114D and the user activity logs 114E. The data processing engine 116 may scan and analyze the server alerts 114D and the user activity logs 114E for each of the plurality of servers 106 to generate the plurality of contextual data 130B.

The categorization unit 116B of the data processing engine 116, may cluster the server alerts 114D based on a plurality of parameters to generate a plurality of clustered data. In non-limiting examples, the plurality of parameters may include type of the server alerts, a time period of the server alerts, a severity of the server alerts, a type of servers, a type of server models, frequency of server updates, or login attempts, and the like. In some examples, the type of server alerts 114D may include a hardware related alerts, such as memory related errors, configuration changes related alerts, and the like. Later, the pattern analyzer and ranking engine 116C of the data processing engine 116, may identify and analyze the user activity logs corresponding to each of the plurality of clustered data for identifying a plurality of patterns, and ranking the plurality of patterns of each cluster to generate the plurality of contextual data 130B.

In some examples, the plurality of servers 106 may generate the server alerts 114D, which may include i) outdated firmware version, ii) unauthorized server access, and iii) security attack.

In such examples, the categorization unit 116B may first cluster the aforementioned server alerts 114D, such as i) outdated firmware version, ii) unauthorized server access, and iii) security attack into the plurality of clusters based on the plurality of parameters, for example, a frequency of server update parameter, a login attempt parameter, a severity of server alert parameter. Accordingly, the categorization unit 116B may cluster the aforementioned server alerts 114D into a) a firmware cluster based on the frequency of server update parameter, b) an unauthorized access cluster based on the login attempt parameter, and c) a severity cluster based on the severity of server alert parameter.

In some hypothetical examples, the categorization unit 116B may cluster seven hundred servers of the plurality of servers 106 into a) the firmware cluster, two hundred fifty servers of the plurality of servers 106 into b) the unauthorized access cluster, and fifty servers of the plurality of servers 106 into c) the severity cluster.

The pattern analyzer and ranking unit 116C may then analyze each of the plurality of clusters to obtain the user activity log 114E having resolution to a corresponding cluster, and analyze the user activity logs 114E for each cluster to identify the plurality of patterns. In one example, the pattern analyzer and ranking unit 116C may analyze the user activity logs 114E corresponding to a) the firmware duster to identify a plurality of patterns. In some examples, the pattern analyzer and ranking unit 116C may identify a first pattern of updating the firmware version once in every three months from analyzing a frequency of firmware update log (user activity log). The pattern analyzer and ranking unit 116C may identify a second pattern of updating the firmware version on an ad-hoc basis, for example, anytime within one month of receiving the server alert, from analyzing an ad-hoc firmware update log (user activity log). Similarly, the pattern analyzer and ranking unit 116C may identify a third pattern of updating the firmware version once in six months from analyzing one-time firmware update log (user activity log).

The pattern analyzer and ranking unit 116C may subsequently rank the first, second, and third patterns based on instance of occurrences of each pattern. For example, the pattern analyzer and ranking unit 116C may identify that the first pattern has six hundred instances, the second pattern has seventy-five instances, and the third pattern has twenty-five instances. Accordingly, the pattern analyzer and ranking unit 116C may rank the first pattern as a first ranked pattern, the second pattern as a second ranked pattern, and the third pattern as a third rank pattern. Later, the pattern analyzer and ranking unit 116C may choose the first ranked pattern based on comparison with a predefined threshold value, for example, greater than 100 instances, as defined by the user 108, to generate the data set 130 including the contextual data 130B.

Accordingly, the data processing engine 116 may end up generating the contextual data 130B from the i) outdated firmware version (server alert) and the frequency of firmware update log (user activity log). For example, the contextual data 130B generated from the aforementioned server data 113 may include updating firmware version pattern once in three months for every server alert related to outdated firmware version.

In some other example, the pattern analyzer and ranking unit 116C may analyze the user activity logs 114E corresponding to b) the unauthorized access cluster to identify the plurality of patterns. In some examples, the pattern analyzer and ranking unit 116C may identify a first pattern of an unauthorized login attempt after three login attempts from analyzing an unsuccessful login attempt log (user activity log). The pattern analyzer and ranking unit 116C may identify a second pattern of a passed login attempt after two login attempts from analyzing a successful login attempt log (user activity log).

The pattern analyzer and ranking unit 116C may subsequently rank the first and second patterns based on instance of occurrences of each pattern. For example, the pattern analyzer and ranking unit 116C may identify that the first pattern has three hundred instances and the second pattern has twenty-five instances. Accordingly, the pattern analyzer and ranking unit 116C may rank the first pattern as a first ranked pattern and the second pattern as a second ranked pattern. Later, the pattern analyzer and ranking unit 116C may choose the first ranked pattern based on comparison with a predefined threshold value, for example, greater than 25 instances, as defined by the user 108, to generate the data set 130 including the contextual data 130B.

Accordingly, the data processing engine 116 may end up generating the contextual data 130B from the i) unauthorized server access (server alert) and the unsuccessful login attempt log (user activity log). For example, the contextual data 130B generated from the aforementioned server data 113 may include the unauthorized login attempt pattern after three login attempts for every server alert related to the unauthorized server access.

It may be noted herein that the data processing unit 116 may analyze the server alert related to iii) security attack to cluster the security attack server alerts into a security cluster as discussed hereinabove with respect to the server alerts 114D i) outdated firmware version and ii) unauthorized server access. Later, the data processing unit 116 may identify pattern from the user activity logs corresponding to the security cluster and rank the identified patterns to generate the data set 130 including the contextual data 130B as discussed hereinabove with respect to the server alerts 114D i) outdated firmware version and ii) unauthorized server access.

In certain examples, the data processing engine 116 may use one or more natural language processing (NLP) algorithms for analyzing the server data 113 including the server inventories 114A, the server configuration parameters, the server telemetries 114C, the server alerts 114D, and the user activity logs 114E. Similarly, the data processing engine 116 may use clustering algorithm, such as k-means to cluster the server data 113.

In some non-limiting examples, the plurality of contextual data includes one or more of server updates pattern, frequency of server updates pattern, types of servers identified for server updates pattern, server workloads pattern, user actions pattern, user action counts pattern per server, or last action performed timestamps pattern, and the like.

A sample data set 130 including the plurality of server features 130A and the plurality of contextual data 130B for one server (S1) of the plurality of servers 106 may be as represented below in Table-1. The management system 102 may generate the data set 130 for each of the plurality of servers 130 as described hereinabove.

TABLE 1

| SERVER - S1 | |
| --- | --- |
| PLURALITY OF SERVER FEATURES | FIRMWARE VERSION - 3.2<br>OPERATING SYSTEM VERSION - 1.2<br>MODEL NUMBER - 123456, 64 bit<br>PORT STATUS OVER LAN<br>THERMAL SENSOR VALUES & REGISTER VALUES<br>CPU, MEMORY, & IO INFORMATION BASED ON THE SERVER TELEMETRIES<br>USER PROFILE/SERVER CONFIGURATIONS |
| PLURALITY OF CONTEXTUAL DATA | FREQUENCY OF SERVER (FIRMWARE) UPDATES PATTERN<br>UNAUTHORIZED LOGIN ATTEMPT PATTERN |

Later, the policy manager 118 may provide a plurality of actions that the management system 102 may support for the management of the plurality of servers 106. It may be noted herein that the plurality of actions is the various granular server actions that the management system 102 supports for data center 104 management. In some examples, the plurality of actions may include, for example, server updates, scheduling updates, applying security patches, configuration changes, updating server user details, applying security profiles, and the like. In some examples, each of the plurality of actions may be applied on the identified servers of the plurality of servers 106 to secure the workload from vulnerabilities or reduce the workload downtime. In some examples, a sample list of the plurality of actions may include i) apply strong security profile, ii) schedule and stage server update, iii) backup server configurations, and iv) recover server firmware.

The policy manager 118 may further map each of the plurality of actions to a plurality of criteria to generate an action criteria table 132. For example, the policy manager 118 may identify the plurality of criteria that triggers each of the plurality of actions and combine the identified plurality of criteria using one or more conditions to map the combination of the plurality of criteria to each action.

For example, the policy manager 118 may identify that the action related to apply strong security profile may be triggered based on the following criteria a) security attack/intrusion detected, b) IPMI/DCMI port enabled over LAN, and c) minimum password length rules not satisfied. The policy manager 118 may further combine the plurality of identified criteria based on a relevancy of each of the identified criteria. In some examples, the relevancy is based on user defined predefined values. For example, security attack/intrusion detected condition and the minimum password length rules not satisfied condition may have a highest predefined value, for example, 10 in the range of 1-10. However, the IPMI/DCMI port enabled over LAN condition may have a lowest predefined value, for example, 3.

Accordingly, the policy manager 118 may combine the identified plurality of criteria using the one or more conditions to map the combination of the plurality of criteria to the action. It may be noted herein that the conditions may be either "AND"/"OR" operators. For example, the policy manager 118 may combine the security attack/intrusion detected condition with the minimum password length rules not satisfied condition using the AND operator. However, the minimum password length rules not satisfied condition is combined using the OR operator.

In some examples, the policy manager 118 may also allow the user 108 to modify/add criteria's to the action criteria table 132. The policy manager 118 may define which latest baseline store 122 to be compared with for server updates. The policy manager 118 may also define policies to update the plurality of servers 106 that are idle or in maintenance mode etc. It may be noted herein that the baseline store 122 may include the latest versions of the updates, for example, firmware versions, operating system versions, and the like. In some examples, the baseline store 122 may be linked to a plurality of proprietary stores (not shown) to obtain the latest versions of the updates from a corresponding proprietary store. It may be noted herein that each criterion of the plurality of criteria may also function like a rule that defines what needs to be checked for the management of the servers 106.

A sample action criteria table 132 including the plurality of actions and the plurality of criteria mapped to each of the plurality of actions may be as represented below in Table-2, where the subject "CON" refers to condition operator.

TABLE 2

| SERVER ACTION | CRITERIA - 1 | CON | CRITERIA - 2 | CON | CRITERIA - 3 |
| --- | --- | --- | --- | --- | --- |
| APPLY STRONG SECURITY PROFILE | SECURITY ATTACKS/ INTRUSION DETECTED | OR | IPMI/DCMI OVER LAN ENABLED | AND | MINIMUM PASSWORD LENGTH RULES NOT SATISFIED |
| SCHEDULE & STAGE SERVER UPDATE | NOT COMPLIANT WITH THE LATEST RELEASED PACKAGE | OR | USER PATTERN IDENTIFIED WHERE A SPECIFIC SET OF SERVERS WERE UPDATED PERIODICALLY | OR | SCHEDULE UPDATES ON IDLE SERVERS BASED ON THE SERVER TELEMETRY |

TABLE 2-continued

| SERVER ACTION | CRITERIA - 1 | CON | CRITERIA - 2 | CON | CRITERIA - 3 |
|---|---|---|---|---|---|
| BACKUP SERVER CONFIGURATIONS | LOT OF UNAUTHORIZED LOGIN ATTEMPT EVENTS | OR | SECURITY ATTACKS/ INTRUSION DETECTED | OR | USER PATTERN IDENTIFIED WHERE USER PERIODICALLY PERFORM BACKUP |
| RECOVER SERVER FIRMWARE | BIOS CORRUPTED AND SYSTEM NOT BOOTING | OR | FIRMWARE SCAN DETECTED ANOMALY | | |

In some examples, the plurality of criteria includes a dynamic contextual criteria derived by the data processing engine 116 based on at least some of the plurality of contextual data. For example, the following criteria—user pattern identified where a specific set of servers were updated periodically (as mentioned in table-2 or action criteria table 132) may have been derived from the data processing engine 116 based on the analysis the server alerts 114D and the user activity logs 114E, and generation of contextual data 130B. Similarly, the following criteria—minimum password length rules not satisfied (as mentioned in table-2 or action criteria table 132) may have been derived from the data processing engine 116 based on the analysis of the server configuration parameters 114B, and generation of the server features 130A.

In some other examples, the plurality of criteria may include a predefined criteria defined by the policy manager 118. For example, the following criteria—BIOS corrupted and system not booting and/or IPMI/DCMI over LAN enabled (as mentioned in table-2 or action criteria table 132) may be predefined criteria by the policy manager 118.

In some other examples, the plurality of criteria may include a static criteria defined by the user 108 based on at least some of the plurality of the server features 130A. For example, the following criteria—schedule updates on idle servers based on the server telemetry (as mentioned in table-2 or action criteria table 132) may have been derived from the data processing engine 116 based on the analysis of the server telemetries 114C, and generation of the server features 130A.

Further, the action-context-criteria analyzer engine 120 may compare the plurality of criteria corresponding to each action in the action criteria table 132 to one or more of the plurality of contextual data 130B or the plurality of server features 130A, for each server to tag a corresponding server to the action.

For example, the action-context-criteria analyzer engine may compare the criteria [i) not compliant with the latest released package or ii) user pattern identified where a specific set of servers were updated periodically or iii) schedule updates on idle servers based on the server telemetry] corresponding to the schedule & stage server update action in the action criteria table 132 to the to one or more of the plurality of contextual data 130B or server features 130A. If any one of the aforementioned criterion is determined in the contextual data or the server features of any one of the plurality of servers 106, that determined server is tagged to the schedule & stage server update action. The aforementioned process of comparing the criteria to the contextual data or the server features is repeated for all of the plurality of servers 106. Similarly, the aforementioned process of comparing the criteria to the contextual data or the server features is repeated for all of the plurality of actions until each of the plurality of servers 106 is tagged to one or more actions listed in the action criteria table 132.

For example, in a data center 104 having two hundred numbers S1-S200 (nos.) of servers 106, the server nos. S1-S100 and the server nos. S120-S200 of the plurality of servers 106 may have been tagged to the apply strong security profile action. Similarly, the server nos. S51-S140 of the plurality of servers may have been tagged to the schedule & stage server update action. Further, the server nos. S101-S120 may have been tagged to the backup server configuration action. Finally, the server nos. S1-S10 and the server nos. S180-S200 may have been tagged to the recover server firmware action.

The server grouping engine 124 may then group the plurality of servers 106 into a plurality of action contextual groups 134 based on the tag of the corresponding server to the action. In some examples, the server grouping engine 124 may group the server nos. S1-S100 and the server nos. S120-S200 to group 1 based on the tag related to the apply strong security profile action. Similarly, the server grouping engine 124 may group the server nos. S51-S140 to group 2 based on the tag related to the schedule & stage server update action. Further, the server grouping engine 124 may group the server nos. S101-S120 to group 3 based on the tag related to the backup server configuration action. Further, the server grouping engine 124 may group the server nos. S1-S10 and the server nos. S180-S200 to group 4 based on the tag related to recover server firmware action.

In some examples, the server grouping engine 124 may further cluster one or more servers in each action contextual group (1-4) into an action contextual sub-group 134A. For example, the server nos. S51-S52 and server nos. S120-S121, and server no. S200 in group 1 may be clustered into the action contextual sub-group 1A. Similarly, the server nos. S60-S70 in group 2 may be clustered into the action contextual sub-group 2A. Further, the server nos. S110-S115 in group 3 may be clustered into the action contextual sub-group 3A. Finally, the server nos. S6 and S190-S193 in group 4 may be clustered into the action contextual sub-group 4A. It may be noted herein that the action contextual sub-groups 1A-4A may be formed based on a type of the workload been executed by each server 106 in the action contextual group 134. For example, the servers 106, which are executing development workload or testing workload may be chosen to be part of the action contextual sub-groups 134A. Whereas, the servers 106 which are executing the production workload may not be chosen for the action contextual sub-groups 134A.

The action implementing engine 126 may first evaluate each of the plurality of actions in the action criteria table 132 on the one or more servers of the action contextual sub-group 134A. Later, the action implementing engine 126 may apply the evaluated action on the plurality of servers 106 corresponding to the action contextual group 134 based on the evaluation result of the action on the one or more servers of the action contextual sub-group 134A. For example, if the applied action on the action contextual sub-group 134A has not generated errors, then the evaluated action is applied to the corresponding action contextual group 134. The testing of actions in each action contextual sub-group 134A may help to detect early errors, which could otherwise result in the workload downtime.

The action implementing engine 126 may trigger an action of the plurality of actions to apply on the plurality of servers 106 tagged to a corresponding action contextual group 134 based on fulfilment of the plurality of criteria corresponding to the action, as described hereinabove. In some examples, the action implementing engine 126 may automatically trigger the action, if the user 108 has provided the consent. In some other examples, the action implementing engine 126 may generate an notification to the user 108 and based on the user consent, the action implementing engine 126 may trigger the action.

In some examples, when the criteria defines the rules to check if the firmware versions in the servers are compliant with the latest versions. In such cases, the action implementing engine 126 may look up at the baseline store 122, finds the latest versions, and compares the latest versions with the firmware versions of the server components to derive the results. Accordingly, the action implementing engine 126 may update the firmware versions of the server components, if the server versions are outdated in comparison with the latest versions.

In one or more examples, the management system 102 may periodically regenerate the data set 130 including the plurality of server features 130A and the plurality of contextual data 130B. Accordingly, the management system 102 may use the data set 130 and the action context table 132 to dynamically categorize the plurality of servers 106 into the plurality of action contextual groups 134 with different depths and hierarchy.

Figure 2:
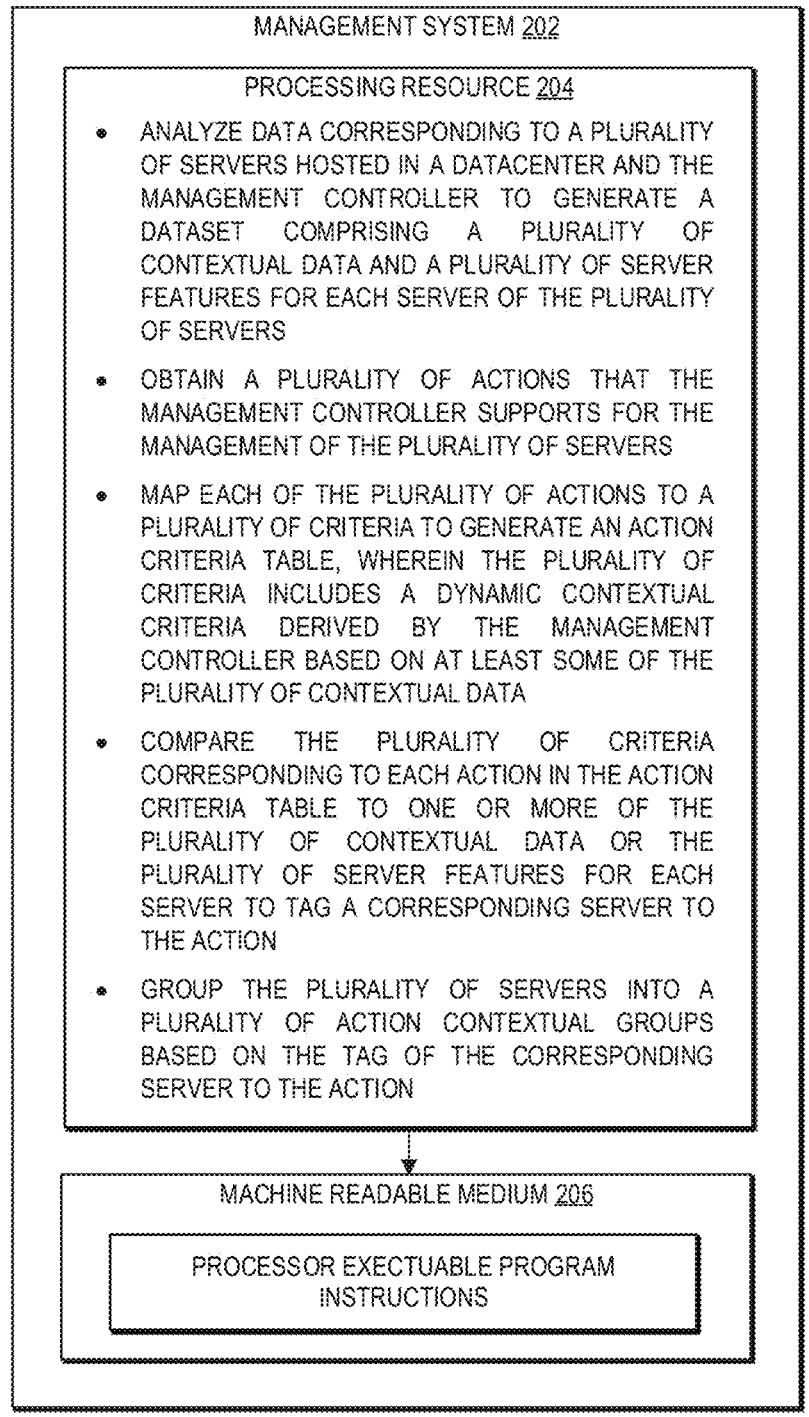
FIG. 2 is a block diagram depicting a computing system, for example, a management system having a processing resource operably coupled to a machine readable medium storing executable program instructions, in accordance with embodiments of the present disclosure.

FIG. 2 is a block diagram of a computing system, for example, a management system 202 including a processing resource 206 and a machine readable medium 208 storing executable program instructions. It should be noted herein that the management system 202 referred to in FIG. 2 may be same or similar to a management system 102 described in FIG. 1. In some examples, the processing resource 206 is operably coupled to the machine readable medium 208. The processing resource 204 may be a physical processor. In some examples, the physical processor may be at least one of a central processing unit (CPU), a microprocessor, and/or other hardware devices suitable for performing the functionality described in relation to FIG. 1. In some examples, the machine readable medium 206 is non-transitory and is alternatively referred to as a non-transitory machine readable medium.

The processing resource 204 executes one or more program instructions to perform one or more functions described in FIG. 1. For example, the processing resource 204 may execute program instructions to analyze data corresponding to a plurality of servers hosted in a data center and the management system to generate a dataset including a plurality of contextual data and a plurality of server features for each server of the plurality of servers. In some examples, the plurality of contextual data may be generated from the data including server alerts and user activity logs. The plurality of server features may be generated from the data including server inventories, server configuration parameters, and server telemetries. The steps of analyzing the data to generate the plurality of contextual data and the plurality of server features are described in conjunction with FIG. 1.

The processing resource 204 may further execute the program instructions to obtain a plurality of actions that the management system supports for the management of the plurality of servers. In some examples, the plurality of actions may include, for example, server updates, scheduling updates, applying security patches, configuration changes, updating server user details, applying security profiles, and the like.

Further, the processing resource 204 may execute the program instructions to map each of the plurality of actions to a plurality of criteria to generate an action criteria table. In some examples, the processing resource may include at least some of the plurality of contextual data derived from the management system as the plurality of criteria. In some other examples, the plurality of criteria may include one or more of a predefined criteria defined by the management system or a static criteria defined by a user based on at least some of the plurality of the server features. The steps of mapping the plurality of criteria to each action of the plurality of actions to generate the action criteria table is as described in FIG. 1.

The processing resource 204 may further execute the program instructions to compare the plurality of criteria corresponding to each action in the action criteria table, to one or more of the plurality of contextual data or the plurality of server features for each server to tag a corresponding server to the action. The steps of comparing the criteria in each action to the contextual data for tagging at least two or more servers to the corresponding action is as described in FIG. 1.

Further, the processing resource 204 may group the plurality of servers into a plurality of action contextual groups based on the tag of the corresponding server to the action. In some examples, each action contextual group may include a sub-group for testing the action before applying the evaluated action on all other servers corresponding to the action contextual group. The steps of grouping the plurality of servers to the plurality of action contextual groups is as described in FIG. 1.

Figure 3:
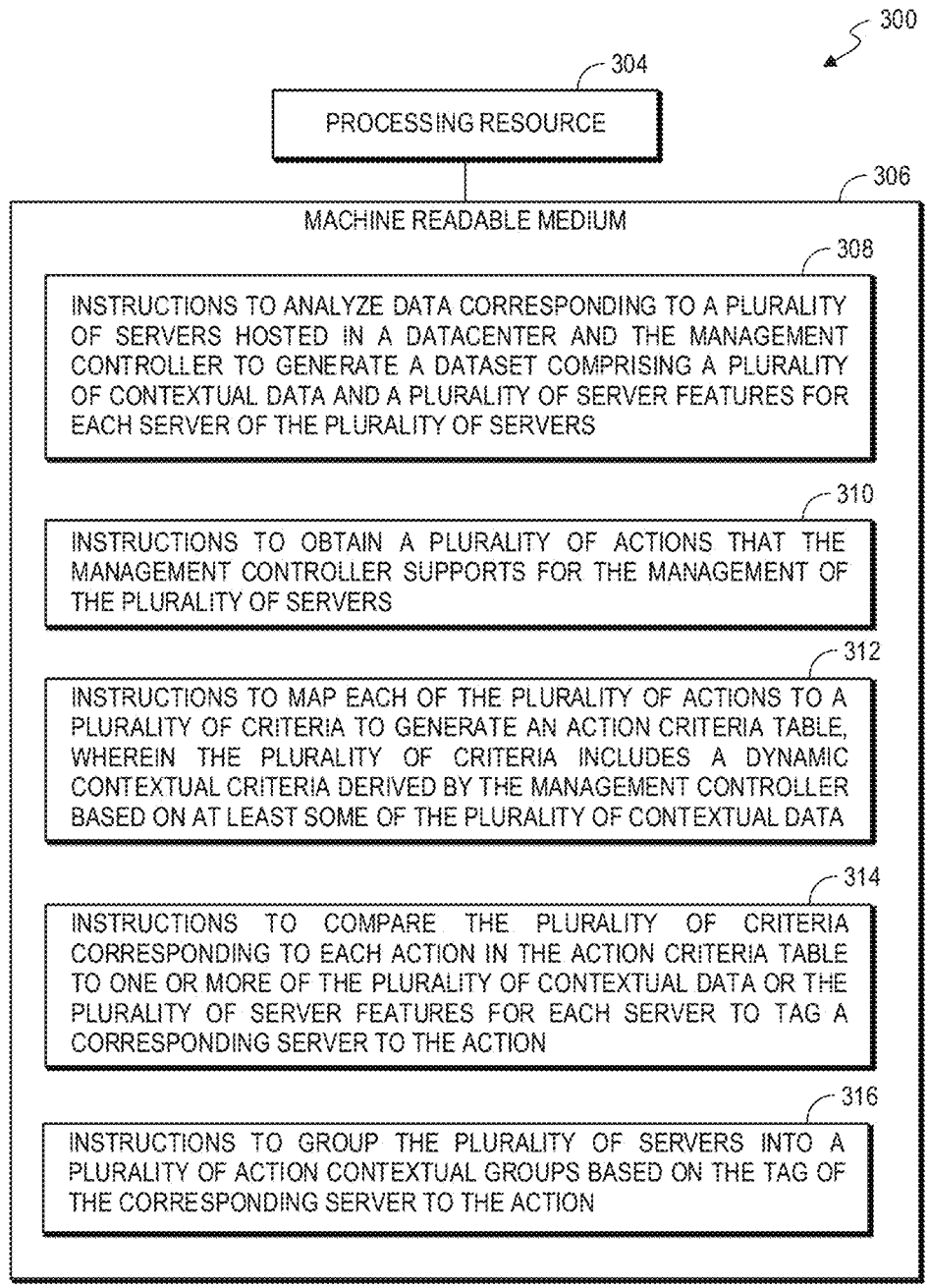
FIG. 3 is a block diagram depicting a processing resource and a machine readable medium encoded with example instructions to process data in a computing system, for example, a management system, in accordance with embodiments of the present disclosure.
Figure 4:
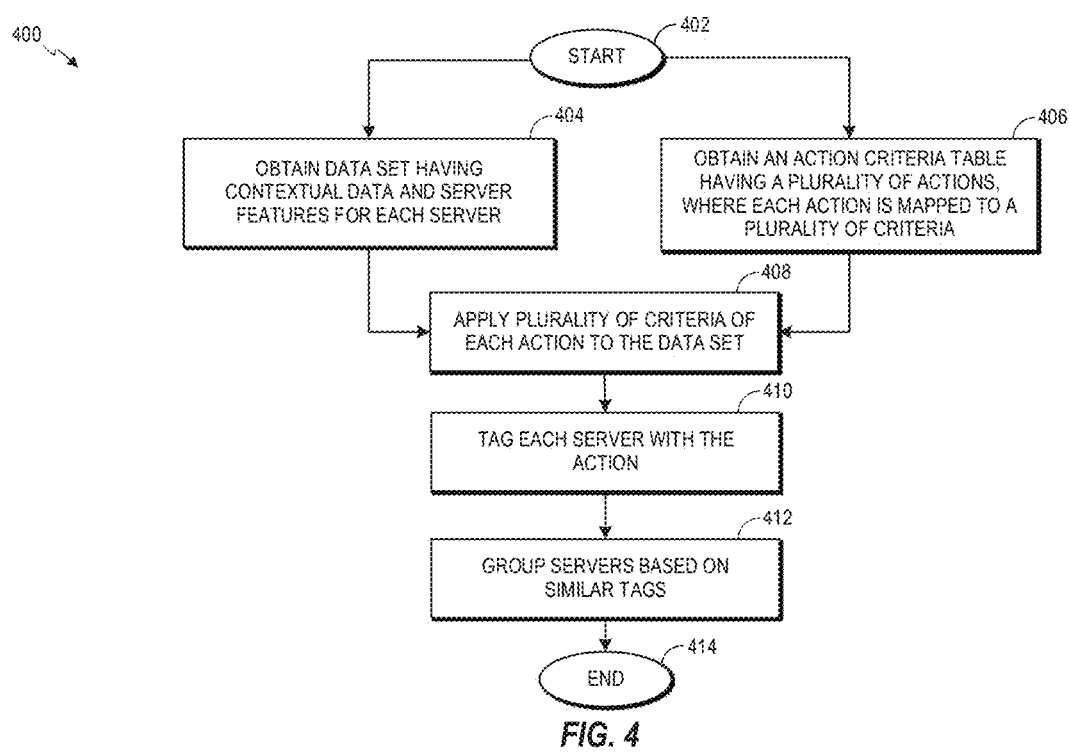
FIG. 4 is a flow diagram depicting a method of grouping a plurality of servers hosted in a data center and applying actions on a plurality of groups using a management system, in accordance with embodiments of the present disclosure.

FIG. 3 is a block diagram 302 depicting a processing resource 304 and a machine readable medium 306 encoded with example instructions to process data in a computing system, such as a management system. In some examples, the management system is operated in an example environment, for management of plurality of compute node, such as a plurality of servers hosted in a data center. It should be noted herein that the management system referred to in FIG. 3 may be same or similar to management system 102, 202 described in FIGS. 1 and 2 respectively. The machine readable medium 306 is non-transitory and is alternatively referred to as a non-transitory machine readable medium. In some examples, the machine readable medium 306 may be accessed by the processing resource 304. In some examples, the machine readable medium 306 stores the program instructions corresponding to functionality of the management system, as discussed in FIG. 1.

The machine readable medium 306 may be encoded with example instructions 308, 310, 312, 314, 316. In some examples, the management system may receive data, such as server inventories, server telemetries, server configuration parameters, server alerts required for generating contextual data from the plurality of servers, and the data, such as user activity logs from the management system itself, and store the data in a data store. In such examples, the instruction 308, when executed by the processing resource 304, may implement aspects of analyzing the data stored in the data store to generate a dataset including a plurality of contextual data and a plurality of server features for each server of the plurality of servers. The steps of analyzing the data to generate the plurality of contextual data and the plurality of server features is as described in FIG. 1.

The instruction 310, when executed, may cause the processing resource 304 to obtain a plurality of actions that the management system supports for the management of the plurality of servers, as described in FIG. 1. In some examples, the plurality of actions may include, for example, server updates, scheduling updates, applying security patches, configuration changes, updating server user details, applying security profiles, and the like. The steps of obtaining the plurality of actions is as described in FIG. 1.

The instruction 312, when executed, may cause the processing resource 304 to identify map each of the plurality of actions to a plurality of criteria to generate an action criteria table, as described in FIG. 1. In some examples, the plurality of criteria includes a dynamic contextual criteria derived by the management system based on at least some of the plurality of contextual data. In some other examples, the plurality of criteria includes a predefined criteria defined by the management system or a static criteria defined by a user based on at least some of the plurality of the server features. In some examples, mapping the action to the plurality of criteria includes identifying the plurality of criteria that triggers each of the plurality of actions and combining the plurality of criteria using one or more conditions to map the combination of the plurality of criteria to each action. The steps of mapping the action to the plurality of criteria is as described in FIG. 1.

Further, the instructions 314, when executed, may cause the processing resource 304 to compare the plurality of criteria corresponding to each action in the action criteria table to one or more of the plurality of contextual data or the server features for each server to tag a corresponding server to the action, as described in FIG. 1. In particular, the processing resource 304 may compare the combination of the plurality of criteria to the contextual data or the server parameter to tag each server to the corresponding action, as described in FIG. 1.

In some examples, the instructions 316, when executed, may cause the processing resource 304 to group the plurality of servers into a plurality of action contextual groups based on the tag of the corresponding server to the action. In some examples, each action contextual group may include a sub-group for testing the action before applying the evaluated action on all other servers corresponding to the action contextual group. The steps of grouping the plurality of servers into the plurality of action contextual group/sub-groups are as described in FIG. 1.

FIG. 4 is a flow diagram depicting a method 400 of clustering a plurality of servers into a plurality of action contextual groups and applying an action of a plurality of actions on the plurality of action contextual groups in accordance to embodiments of the present disclosure. It should be noted herein that the method 400 is described in conjunction with FIG. 1.

The method 400 starts at block 402 and continues to blocks 404 and 406. At block 404, the method 400 includes obtaining data set having contextual data and server features for each server. In some examples, the method 400 of obtaining the data set includes receiving data including server inventories, server telemetries, server configuration parameters, and server alerts from a plurality of servers of a data center. Further, the method 400 of obtaining the data set further includes receiving the data including user activity logs from a management system. The method 400 further includes analyzing the data including the server inventories, the server telemetries, the server configuration parameters to generate the data set including the server features. Similarly, the method 400 further includes analyzing the data including the server alerts and user activity logs to generate the contextual data. The steps of generating the data set including the server features and the contextual data is as described in FIG. 1.

At block 406, the method 400 includes obtaining an action criteria table having a plurality of actions, where each action is mapped to a plurality of criteria. In some examples, the method 400 of obtaining the action criteria table includes obtaining the plurality of actions that the management system supports for the management of the plurality of servers. Further, the method 400 includes mapping each of the plurality of actions to a plurality of criteria to generate an action criteria table. In some examples, mapping includes identifying the plurality of criteria that triggers each of the plurality of actions and combining the plurality of criteria using one or more conditions to map the combination of the plurality of criteria to each action. In some examples, the plurality of criteria includes a dynamic contextual criteria derived by the management system based on at least some of the plurality of contextual data. In some other examples, the plurality of criteria includes a predefined criteria defined by the management system or a static criteria defined by a user based on at least some of the plurality of the server features. The steps of generating the action criteria table is as described in FIG. 1.

Further, the method 400 continues to block 408. At block 408, the method 400 includes applying the plurality of criteria of each action in the action criteria table, to the data set. In some examples, the method 400 includes comparing a combination of the plurality of criteria with the data set including the contextual data or the server features to identify the servers to identify the servers that needs to be tagged to the corresponding action. The steps of comparing the criteria to the data set is as described in FIG. 1.

Further, the method 400 continuous to block 410. At block 410, the method 400 includes tagging each server with the action. In some examples, the method 400 includes tagging the plurality of servers to one distinctive tag, when the combination of criteria in the action context table for each action, is substantially similar to at least one of the contextual data or the server feature of the data set. The steps of tagging the plurality of servers to the corresponding action in the action criteria table is as described in FIG. 1.

The method 400 continuous to block 412. At block 412, the method 400 includes grouping servers based on similar tags. In some example, the method 400 includes identifying and grouping the plurality of servers having similar tags to form a plurality of action contextual groups, as described in FIG. 1. The method 400 ends at block 414.

Various features as illustrated in the examples described herein may be implemented to provide "action context" aware dynamic grouping of servers by automatically understanding the data center landscape and intelligently creating dynamic server groups based on analyzed data for performing specific server actions. The management system may schedule the server actions to be automatically applied by detecting the user patterns from the historical updates on the servers. Further, the server action may be applied to the plurality of servers tagged to an action contextual group, which is dynamically created based on the contextual data.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A method comprising:
analyzing, by a processing resource comprising a hardware processor, data corresponding to a plurality of servers hosted in a data center to generate a dataset comprising a plurality of contextual data and a plurality of server features for each server of the plurality of servers, the plurality of contextual data based on clustering server alerts from the plurality of servers, the server alerts relating to one or more of faults, configuration issues, outdated versions of machine-readable instructions, or unauthorized access of the plurality of servers;
obtaining, by the processing resource, information of a plurality of actions that a management system supports for management of the plurality of servers, the plurality of actions comprising one or more of updates of machine-readable instructions, configuration changes, or application of security profiles;
mapping, by the processing resource, the plurality of actions to a plurality of criteria to generate an action criteria table, wherein the plurality of criteria comprises dynamic contextual criteria derived by the management system based on at least some of the plurality of contextual data;
comparing, by the processing resource, the plurality of criteria corresponding to an action in the action criteria table to one or more of the plurality of contextual data or the plurality of server features for a server to tag the server to the action;
grouping, by the processing resource, the plurality of servers into a plurality of action contextual groups based on the tag of the server to the action;
determining, by the processing resource, a sub-group of a first action contextual group of the plurality of action contextual groups, the determining of the sub-group comprising identifying servers in the first action contextual group that execute development or testing workload;
testing, by the processing resource, execution of a given action of the plurality of actions in servers of the sub-group; and
based on a determination that the execution of the given action in the servers of the sub-group has not generated an error, applying, by the processing resource, the given action to servers of the first action contextual group.

2. The method of claim 1, wherein the data comprises the server alerts and user activity logs, the clustering of the server alerts generates a plurality of clustered data, and wherein the analyzing of the data comprises:
analyzing the user activity logs corresponding to each of the plurality of clustered data to identify a plurality of patterns; and
ranking the plurality of patterns to generate the plurality of contextual data.

3. The method of claim 1, wherein the clustering of the server alerts is based on a plurality of parameters, the plurality of parameters comprising one or more of a type of a server alert, a time period of a server alert, a severity of a server alert, a type of a server, login attempts, or a frequency of server updates.

4. The method of claim 1, wherein the plurality of contextual data comprises one or more of a server updates pattern, a frequency of server updates, a server workloads pattern, or a user actions pattern.

5. The method of claim 1, wherein the data comprises server inventory data, server telemetry data, and server configuration parameters, and wherein the analyzing of the data comprises normalizing the server inventory data, the server telemetry data, and the server configuration parameters to generate the plurality of server features.

6. The method of claim 1, wherein the applying of the given action to the servers of the first action contextual group comprises applying one or more of a server upgrade or a security patch update.

7. The method of claim 1, wherein the mapping of the plurality of actions to the plurality of criteria comprises:
identifying the plurality of criteria that triggers the plurality of actions; and
combining the plurality of criteria using one or more conditions to map a combination of the plurality of criteria to an action of the plurality of actions.

8. The method of claim 1, wherein the plurality of criteria further comprises one or more of a predefined criteria defined by the management system or a static criteria defined by a user based on at least some of the plurality of the server features.

9. The method of claim 1, wherein the determining of the sub-group of the first action contextual group comprises excluding a server, which is part of the first action contextual group, that executes a production workload.

10. The method of claim 1, wherein the applying of the given action to the servers of the first action contextual group comprises applying one or more of applying a security profile, applying a backup server configuration, recovering server firmware, or updating firmware.

11. A management system comprising:
a processing resource; and
a non-transitory storage medium storing instructions executable by the processing resource to:
analyze data corresponding to a plurality of servers hosted in a data center to generate a dataset comprising a plurality of contextual data and a plurality of server features for each server of the plurality of servers, the plurality of contextual data based on clustering server alerts from the plurality of servers, the server alerts relating to one or more of faults, configuration issues, outdated versions of machine-readable instructions, or unauthorized access of the plurality of servers;

obtain information of a plurality of actions that the management system supports for management of the plurality of servers, the plurality of actions comprising one or more of updates of machine-readable instructions, configuration changes, or application of security profiles;

map the plurality of actions to a plurality of criteria to generate an action criteria table, wherein the plurality of criteria comprises a dynamic contextual criteria derived by the management system based on at least some of the plurality of contextual data;

compare the plurality of criteria corresponding to an action in the action criteria table to one or more of the plurality of contextual data or the plurality of server features for a server to tag the server to the action;

group the plurality of servers into a plurality of action contextual groups based on the tag of the server to the action;

determine a sub-group of a first action contextual group of the plurality of action contextual groups, the determining of the sub-group comprising identifying servers in the first action contextual group that execute development or testing workload;

test execution of a given action of the plurality of actions in servers of the sub-group; and based on a determination that the execution of the given action in the servers of the sub-group has not generated an error, apply the given action to servers of the first action contextual group.

12. The management system of claim 11, wherein the data comprises server alerts and user activity logs, the clustering of the server alerts generates a plurality of clustered data, and wherein the analyzing of the data comprises:

analyzing the user activity logs corresponding to each of the plurality of clustered data to identify a plurality of patterns; and ranking the plurality of patterns to generate the plurality of contextual data.

13. The management system of claim 11, wherein the data comprises server inventory data, server telemetry data, and server configuration parameters, and wherein the analyzing of the data comprises normalizing the server inventory data, the server telemetry data, and the server configuration parameters to generate the plurality of server features.

14. The management system of claim 11, wherein the mapping of the plurality of actions to the plurality of criteria comprises:

identifying the plurality of criteria that triggers the plurality of actions; and combining the plurality of criteria using one or more conditions to map a combination of the plurality of criteria to an action of the plurality of actions.

15. The management system of claim 11, wherein the plurality of criteria further comprises one or more of a predefined criteria defined by the management system or a static criteria defined by a user based on at least some of the plurality of the server features.

16. The management system of claim 11, wherein the determining of the sub-group of the first action contextual group comprises excluding a server, which is part of the first action contextual group, that executes a production workload.

17. The management system of claim 11, wherein the clustering of the server alerts is based on a plurality of parameters, the plurality of parameters comprising one or more of a type of a server alert, a time period of a server alert, a severity of a server alert, a type of a server, login attempts, or a frequency of server updates.

18. A non-transitory machine readable medium comprising instructions executable by a processing resource in a management system to:

analyze data corresponding to a plurality of servers hosted in a data center to generate a dataset comprising a plurality of contextual data and a plurality of server features for each server of the plurality of servers, the plurality of contextual data based on clustering server alerts from the plurality of servers, the server alerts relating to one or more of faults, configuration issues, outdated versions of machine-readable instructions, or unauthorized access of the plurality of servers;

obtain information of a plurality of actions that the management system supports for management of the plurality of servers, the plurality of actions comprising one or more of updates of machine-readable instructions, configuration changes, or application of security profiles;

map the plurality of actions to a plurality of criteria to generate an action criteria table, wherein the plurality of criteria comprises a dynamic contextual criteria derived by the management system based on at least some of the plurality of contextual data;

compare the plurality of criteria corresponding to an action in the action criteria table to one or more of the plurality of contextual data or the plurality of server features for a server to tag a corresponding the server to the action;

group the plurality of servers into a plurality of action contextual groups based on the tag of the server to the action;

determine a sub-group of a first action contextual group of the plurality of action contextual groups, the determining of the sub-group comprising identifying servers in the first action contextual group that execute development or testing workload;

test execution of a given action of the plurality of actions in servers of the sub-group; and based on a determination that the execution of the given action in the servers of the sub-group has not generated an error, apply the given action to servers of the first action contextual group.

19. The non-transitory machine readable medium of claim 18, wherein the applying of the given action to the servers of the first action contextual group comprises applying one or more of a server upgrade or a security patch update.

* * * * *